United States Patent

Kusisto

[15] 3,665,892

[45] May 30, 1972

[54] EXERCISER FOR ANIMALS

[72] Inventor: Ike W. Kusisto, P.O. Box 13237, Phoenix, Ariz. 85002

[22] Filed: Oct. 30, 1970

[21] Appl. No.: 85,461

[52] U.S. Cl. .............................................. 119/29, 119/15.5
[51] Int. Cl. .......................................................... A01k 15/00
[58] Field of Search .......................... 119/15.5, 29; 272/4, 40

[56] References Cited

UNITED STATES PATENTS 3,312,195  4/1967  Rohena ..................................... 119/29
3,424,132  1/1969  Fischer et al. ............................ 119/29

*Primary Examiner*—Aldrich F. Medbery
*Attorney*—Warren F. B. Lindsley

[57] ABSTRACT

An improved exerciser for animals such as dogs including a means movable in unison with the dog for stimulating his activity.

7 Claims, 5 Drawing Figures

Patented May 30, 1972
3,665,892
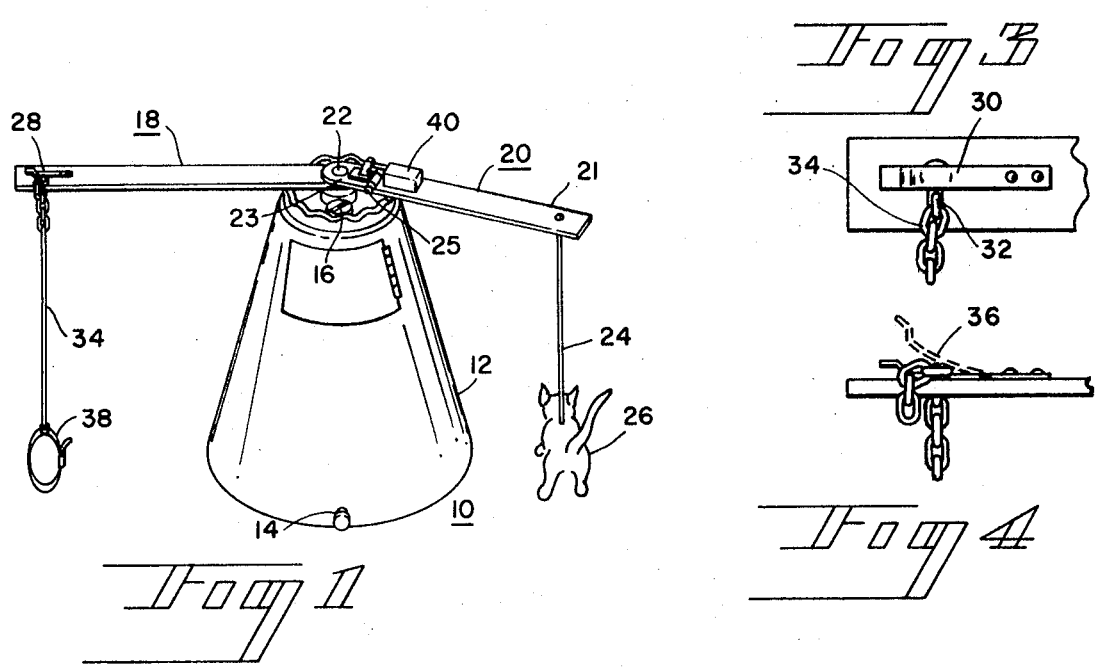
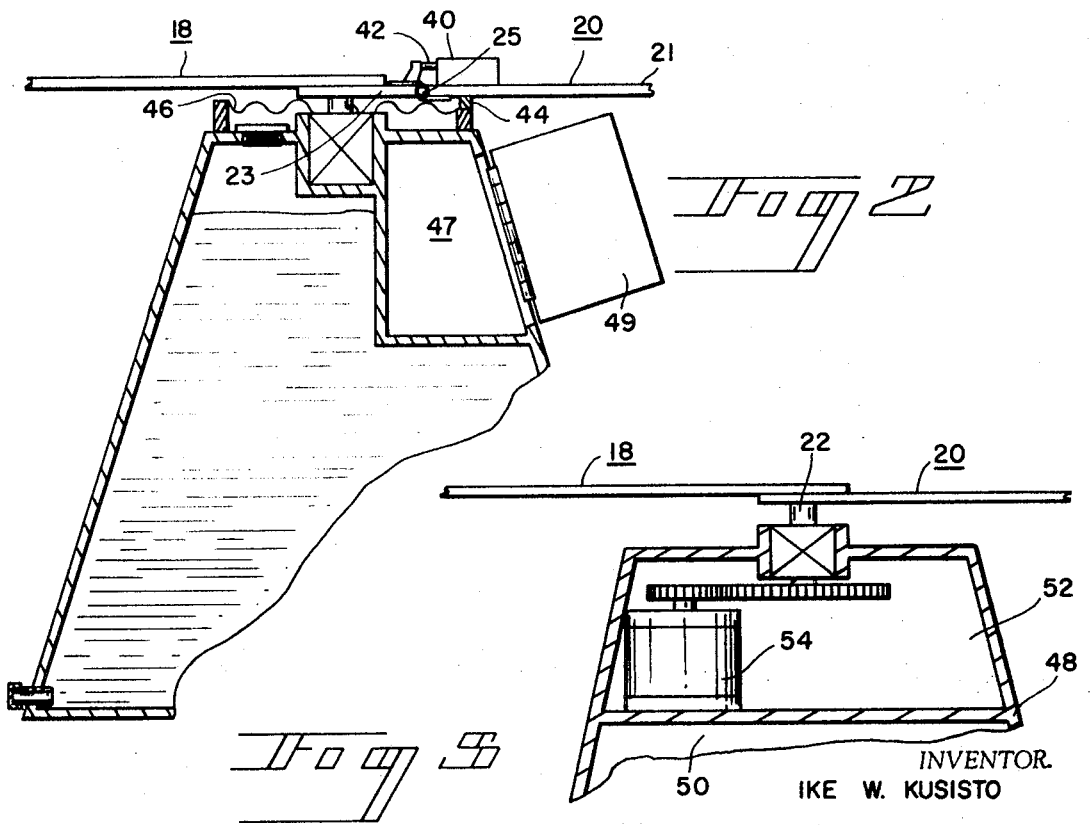
INVENTOR.
IKE W. KUSISTO
BY
ATTORNEY

EXERCISER FOR ANIMALS

BACKGROUND OF THE INVENTION

This invention relates to an exercising means for animals and more particularly to an exercising means for small animals of the canine type which stimulates the animal into walking or running in a given direction.

1. Field of the Invention

This invention is directed to an exercising device for indoor and outdoor use which causes the dog to run or walk around in a circular like path and by such action causing the simultaneous movement of a stimulating device for the dog.

2. Description of the Prior Art

Dog exercising has been a problem for city dwellers and particularly those who live in congested neighborhoods such as apartment or townhouse areas. Not only is there little space for a dog to run but most cities have ordinances which restrict such action. A further deterrent to dog exercising is the time necessary for a dog owner to traverse the course, thus requiring the hiring of a dog walker. Since it is necessary to exercise the dog to maintain his health and disposition, a need exists for a device which will not only exercise the dog but will do so in a small area and in a stimulating manner for the dog.

SUMMARY OF THE INVENTION

In accordance with the invention claimed an improved exercising means for dogs is provided which is compact, stable, easily movable and adaptable for indoor and outdoor use.

It is, therefore, one object of this invention to provide an improved exerciser for small animals of the canine type.

Another object of this invention is to provide an improved rotary dog exerciser which is pedestal mounted and provided with an action stimulator which is actuated in union with the dog's movement.

A further object of this invention is to provide a dog exerciser in which the pedestal is liquid or sand filled and capable of being drained to provide stability and moveability with a minimum amount of difficulty.

A still further object of this invention is to provide a sturdy, economical dog exerciser easily movable for indoor and outdoor use.

Further objects and advantages of the invention will become apparent as the following description proceeds and the features of novelty which characterizes this invention will be pointed out with particularity in the claims annexed to and forming part of this specification.

BRIEF DESCRIPTION OF THE DRAWING

The present invention may be more readily described by reference to the accompanying drawing in which:

FIG. 1 is a perspective view of an animal exerciser and embodying the invention;

FIG. 2 is an enlarged partial front view of FIG. 1 showing in more detail the cam mechanism for actuating the animal stimulator;

FIG 3 is partial view of FIG. 2 taken along the line 2—2 showing the means for engaging the chain of the animal controlled;

FIG. 4 is a front view of FIG. 3 showing the chain locking means in deflected position; and FIG. 5 shows a modification of the structure shown in FIGS. 1–4 wherein the exerciser is electrically driven.

DESCRIPTION OF PREFERRED EMBODIMENT

Referring more particularly to the drawing by characters of reference, FIGS. 1–4 disclose an exerciser 10 for small animals such as dogs which need to be walked and run for health and disposition reasons. The exerciser 10 comprises a hollow frustum 12 which may be formed out of or molded from a suitable plastic or metal which is impervious to liquids such as water. The frustum is provided with a drain plug 14 at its bottom and a fill plug 16 at its top as shown in FIGS. 1 and 2. It is the intention of the inventor that the frustum be filled with water which can be drained at will indoors and outdoors so that the exerciser can be easily moved and still when at least partly filled with water to be relatively stable and immovable by the dog. Sand may be used as a filler if so desired.

Rotatably mounted on the top of frustum 12 is a pair of arms 18 and 20 which may be angularly positioned at less than 180° in the direction of rotation. Each arm is fixedly mounted on a shaft 22 which is rotatably mounted on the top of frustum 12 so that when arm 18 is moved arm 20 moves in unison therewith. Arm 20 comprises a pair of axially arranged parts 21 and 23 which are hingedly connected at 25 so that part 21 may be actuated upward by a cam ring hereinafter described.

To the end of arm 20 may be attached a chain or rope 24 of a predetermined length having tied at its loose end a suitable bait or stimulator 26 such as an imitation cat or rabbit. The bait should be one suitably attractive to the dog being exercised and may be replaced with other types of stimulators as desired.

At the free end of arm 18 is mounted restraining strap or chain adjusting means 28 which as shown in FIGS. 3 and 4 comprises an aperture 30 extending through arm 18 having a slot 32 extending outwardly therefrom in the direction of rotation of the arms. As a link of a chain 34 is pushed upwardly through the aperture 30 it may be arranged to extend criss cross of slot 32 above arm 18 with the juxtapositioned lower link in the chain arranged to extend lengthwise in the slot. In this way the link above the slot holds the chain firmly in the slot. Such an attachment makes it easy to engage and disengage a chain to arm 18. This attachment may also be used for any chain or strap that has a knob or handle at the end of it which may be forced through aperture 30 and the chain or strap captured by slot 32. In order to keep the chain in place a resilient strap or strip of metal 36 may be fastened to arm 18 to cover aperture 30. As shown in FIG. 4 the strip may be deflected to attach and detach chain 34.

At the end of chain 34 is arranged a dog collar or harness 38. It should be noted that the length of chain 34 should be of such a size that the dog straining on the chain or leach can not reach the stimulator 26 attached to the end of rope 24.

In order to further stimulate the dog to walk or run after the bait or stimulator 26 a noise maker 40 is attached to arm 20. This noise maker may be arranged to make a sound characteristic of the type of bait being used. For example, if a cat is used as a bait the sound could be an imitation of a cat in distress. Other baits and other sounds could be simulated.

The noise maker could be actuated by an arm 42 actuated by a cam follower 44 mounted on the lower surface of arm 20 which follows a cam ring 46 mounted on the top of frustum 12. As the cam follower 44 follows the cam ring 46 part 21 of arm 20 is caused to move up and down according to the surface of cam ring 46 which causes the bait or stimulator 26 to move in an erratic way. At the same time the noise maker is actuated so that the bait appears to be making a noise as it moves in an erratic manner. The noise maker is caused to be actuated intermittently by the upward and downward movement of the cam follower 44 of arm 20 following along the cam ring 46.

It should be noted that a compartment 47 may be provided in frustum 12 isolated from the remainder of the hollow inside of the frustum and closed by a door 49 for housing the stimulators 26.

FIG. 5 illustrates a modification of the structure shown in FIGS. 1–4 wherein a frustum 48 is provided in place of frustum 12. This frustum is provided with a water compartment 50 in the lower portion thereof and an isolated water tight compartment 52 in the upper portion thereof. An electric motor 54 is provided in compartment 52 which is geared to the rotatable shaft 22 for actuating arms 18 and 20 causing the dog tied to chain 34 to be forced to walk around frustum 48.

Although but two embodiments of this invention have been illustrated and described it will be obvious to one skilled in the art that various changes may be made in the structure shown without departing from the spirit of the claimed invention.

What is claimed is:

1. An exerciser for live animals comprising:
   a pedestal,
   a pair of angularly spaced arms rotatively mounted on top of said pedestal,
   a first means attached at one end to one of said arms and at the other end to an animal which can walk and run around said pedestal,
   a second means attached at one end to the other arm and at its other end to an animal stimulator,
   a cam mounted on said pedestal,
   a cam follower mounted on said other arm and arranged to move over said cam surface,
   said cam follower causing said other arm to move longitudinally of said pedestal, and
   a noise maker attached to said other arm and acturated by rotative movement of said other arm to simulate a sound characteristic of the stimulator.

2. The exerciser set forth in claim 1 wherein hinge means are provided on said other arm for causing it to pivotally move longitudinally of said pedestal under influence of said cam.

3. The exerciser set forth in claim 1 wherein said pedestal comprises a hollow frustum adapted to receive and hold liquid.

4. The exerciser set forth in claim 3 wherein a drain plug is provided at the base of said frustum and a fill plug at the top of said frustum.

5. The exerciser set forth in claim 1 in further combination with an electric motor mounted on said pedestal and means connecting said motor to said arms for rotation said arms around said pedestal.

6. The exerciser set forth in claim 1 in further combination with means for actuating said noise maker upon longitudinal movement of said other arm.

7. The exerciser set forth in claim 1 wherein said pedestal comprises a frustum,
   said other arm is pivotally mounted to said frustum for longitudinal movement of said frustum upon rotation of said arm,
   a drain plug is provided in the base of said frustum,
   a fill plug is provided in the frustum at the top thereof,
   and said noise maker is actuated by the longitudinal movement of said other arm.

* * * * *